United States Patent
Maucher et al.

[15] 3,695,404
[45] Oct. 3, 1972

[54] CLUTCH PLATE SUPPORTED BY STRESSED LEAF SPRINGS

[72] Inventors: Paul Maucher, Neuweier; Klaus Steeg, Eisental, both of Germany

[73] Assignee: Luk Lamellen und Kupplungsbau GmbH, Buhl (Baden), Germany

[22] Filed: Aug. 5, 1970

[21] Appl. No.: 61,446

Related U.S. Application Data

[63] Continuation of Ser. No. 736,726, June 13, 1968, abandoned.

[52] U.S. Cl. .................... 192/70.18, 64/12, 192/55, 267/110
[51] Int. Cl. .......................................... F16d 13/70
[58] Field of Search ........ 192/70.17, 70.18, 89 B, 55; 64/12

[56] References Cited

UNITED STATES PATENTS

| | | | |
|---|---|---|---|
| 1,962,797 | 6/1934 | Wemp | 192/70.18 |
| 3,450,241 | 6/1969 | Kuno | 192/89 B |
| 3,213,991 | 10/1965 | Smirl et al | 192/70.18 X |
| 2,308,681 | 1/1943 | Eason | 192/55 |
| 2,407,757 | 9/1946 | MacCallum | 192/89 B |
| 3,004,409 | 10/1961 | Grey | 64/12 |
| 1,145,602 | 7/1915 | Lieber | 64/12 |
| 2,177,362 | 10/1939 | Eason | 192/70.18 |
| 3,061,062 | 10/1962 | Smirl | 192/70.18 |

FOREIGN PATENTS OR APPLICATIONS

| | | | |
|---|---|---|---|
| 243,461 | 2/1926 | Italy | 64/14 |

*Primary Examiner*—Benjamin W. Wyche
*Attorney*—Curt M. Avery, Arthur E. Wilfond, Herbert L. Lerner and Daniel J. Tick

[57] ABSTRACT

The axially displaceable pressure plate of a friction clutch is connected with the clutch cover by transmission members consisting of longitudinally wavy leaf springs which are so fastened as to be pre-stressed not only in the axial direction of the clutch but also in their own longitudinal direction. Preferably three such leaf springs are mounted in a triangular arrangement, the middle of each spring being fastened to the pressure plate and the ends of each two adjacent leaf springs being jointly fastened to the cover of the clutch.

9 Claims, 7 Drawing Figures

CLUTCH PLATE SUPPORTED BY STRESSED LEAF SPRINGS

This application is a continuation of application Ser. No. 736,726, filed June 13, 1968, and now abandoned.

Our invention relates to friction clutches in which an axially displaceable pressure plate is urged by pressure spring means toward a frictional entrainer plate and is connected by transmission members with a clutch cover or the like rotating clutch structure, the transmission members being pre-stressed in the axial direction of the clutch.

In a known friction clutch of this type the transmission members are designed as elongated plates and are fastened to the clutch cover on the one hand, and to the pressure plate on the other hand. The transmission members serve to transmit torque from the cover to the pressure plate, to dampen torsional displacements, to centrally guide the pressure plate even under the effect of high positive or negative impact torques, and also to lift the pressure plate off the entrainer disc when the clutch is opened, for which purpose these transmission members are prestressed in the axial direction of the clutch and exert upon the pressure plate a restoring spring force directed axially away from the frictional entrainer disc and opposed to the force of the clutch pressure spring means.

This has the disadvantage that, when the springy transmission members are designed to provide a sufficient restoring force at maximum lift of the clutch, the increasing wear of the clutch linings will cause the spring force of the transmission members to increase with the amount of wear; and since this spring force is opposed to the force of the clutch pressure spring, the result is a progressive reduction in the frictional clutch pressure produced by the clutch spring. Consequently, when the wear of the clutch linings approaches the permissible maximum, there occurs an increasing danger of the clutch slipping through. Furthermore, with spring members of the known type, the opening of the clutch demands an increased amount of force as long as the linings are not yet subjected to any appreciable amount of wear.

It has become known to design the springs of a friction clutch in such a manner as to minimize the change in friction pressure occurring over the available range of spring deflection, whereby the clutch action becomes less sensitive to wear of the friction linings. However, the known design of this type requires complicated springs difficult to manufacture.

It is an object of our invention to minimize or virtually avoid the above-mentioned shortcomings of the known friction clutches.

More specifically, it is an object of our invention, relating generally to friction clutches, to secure a substantially constant lifting spring force over the entire working range of the clutch with the aid of spring means of much simpler design and production than heretofore available.

Still another object of our invention is to provide a friction clutch, aside from the friction-producing pressure spring, with transmission members of particularly simple shape which, though easy to produce and install, reliably secure a clutch action that remains substantially constant with increasing wear of the clutch linings, so that dead slipping of the clutch is avoided.

To achieve these objects, and in accordance with our invention, we give each transmission member in a friction clutch of the above-mentioned type an elongated leaf-spring shape and impart thereto a pre-stress in the longitudinal direction of the transmission member and in superposition to the pre-stress directed axially of the clutch. As a result, the transmission member assumes a spring characteristic which, in combination with the spring characteristic of the clutch pressure spring, achieves the above-stated objects.

According to another feature of our invention, the superimposed pre-stress in the longitudinal direction of the transmission member is preferably secured by giving the elongated transmission member a wavy configuration along its length, and imposing upon this wavy member a compressive force in the longitudinal direction so that the wavy configuration is modified by the stress, the wavy configuration being such that it produces the desired spring characteristic when the member is subjected to the prestressing force.

According to another feature of our invention, a friction clutch is preferably provided with three transmission members in the form of leaf springs which are fastened to the clutch cover, on the one hand, and to the pressure plate, on the other hand, the ends of each two leaf springs having a fastening point in common.

It is particularly advantageous to have the ends of the leaf springs fastened to the clutch cover and to have the middle range of their longitudinal extent fastened to the pressure plate, each two mutually adjacent leaf springs having respective ends conjointly attached to the clutch cover. In such an organization the transmission members are arranged in a chord-like fashion relative to the pressure plate. This affords optimal utilization of the clutch space, especially with reference to uniform transmission of torque in both directions of rotation.

The invention will be further elucidated with reference to an embodiment of a friction clutch according to the invention illustrated by way of example on the accompanying drawings in which.

Figure 1:
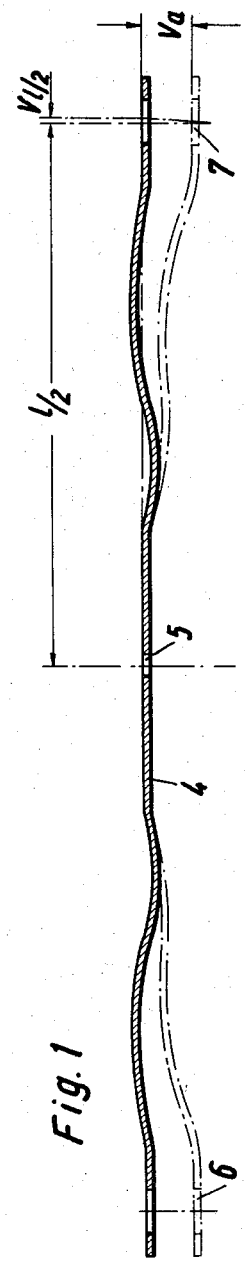
FIG. 1 is a lateral view of a transmission member.

The transmission member shown in FIG. 1 is designed as a leaf spring 4 of wavy shape. It has a fastening hole 5 in the middle of its length and two fastening holes 6 and 7 at the respective ends. The dot-and-dash line shows the shape of the leaf spring in the relaxed condition and hence prior to mounting it into a clutch. The full-line illustration shows the same leaf spring in the shape assumed when it is properly mounted in the clutch and in clutch-engaged position.

In this position, the leaf spring is pre-stressed by the amount Va in the axial direction of the clutch, and it is also pre-stressed by upsetting or compression in the longitudinal direction by the amount VL/2, with L denoting the effective length of the leaf spring. The shortening by compression in the amount of VL/2 is effective in each of the two legs of the spring. The compressive stress VL/2 comes about, for example, by first fastening the leaf spring at its central hole 5 to a clutch structure, then bending the leaf spring at another clutch structure by the amount Va upwardly, and retaining the spacing between the holes 6 and 7 of the relaxed leaf spring also after the leaf spring is pre-stressed. That is, in both conditions (relaxed and pre-stressed) the distance L/2 remains the same.

Figure 2:
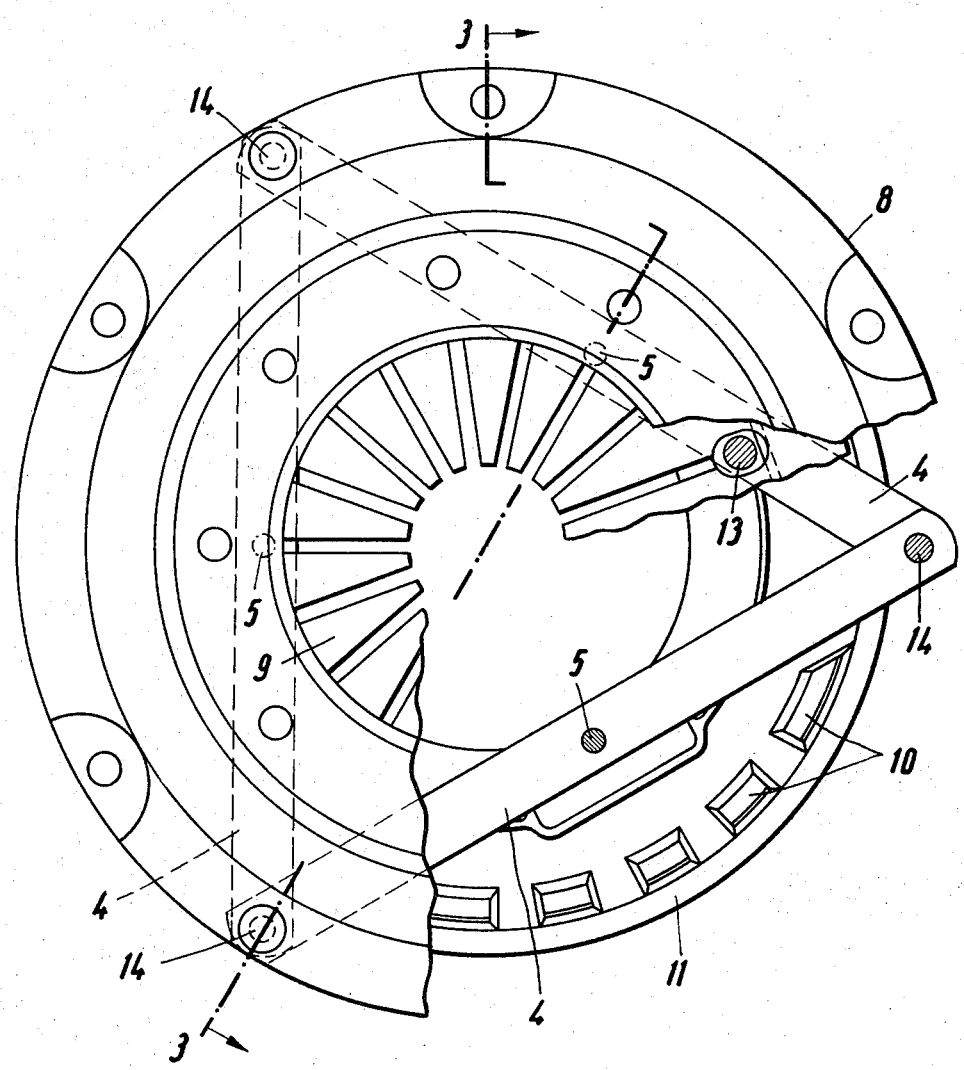
FIG. 2 is a partly sectional front view of a friction clutch equipped with transmission members according to FIG. 1.
Figure 3:
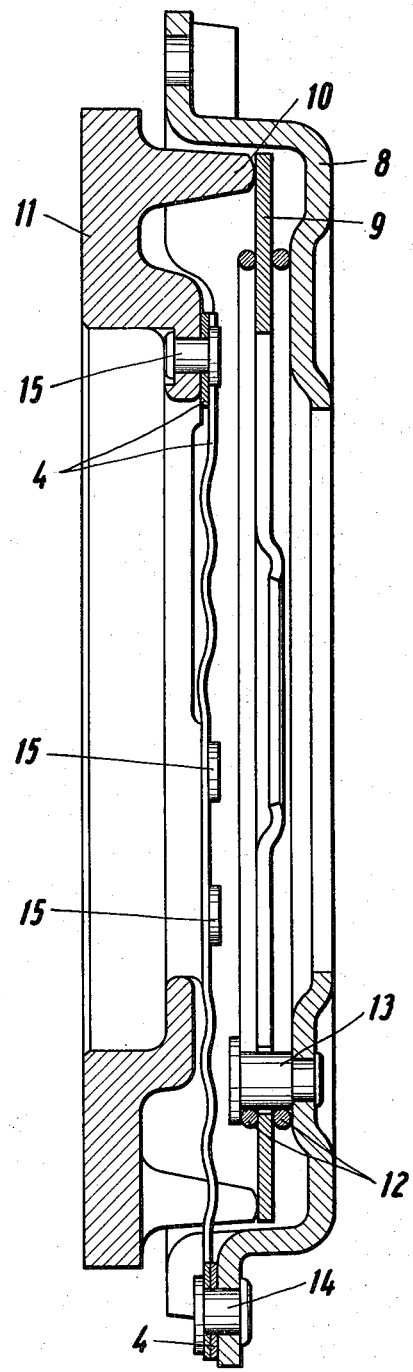
FIG. 3 is a section along the line III—III in FIG. 2, the friction disc and flywheel of the clutch being removed to prevent obscuring of other parts.
Figure 4:
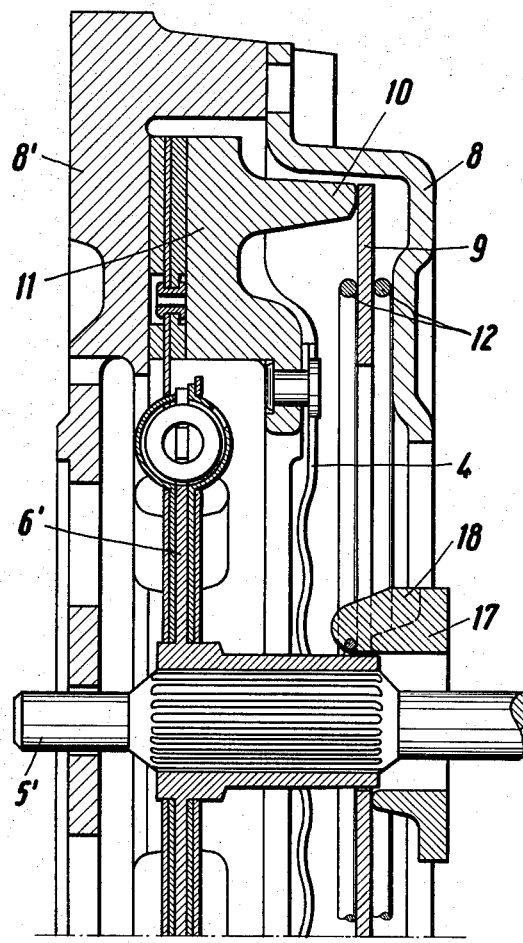
FIG. 4 shows a portion of the same clutch as FIG. 3 but including the flywheel and friction disc.
Figure 5:
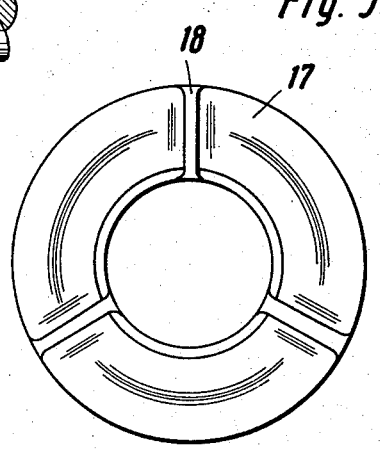
FIGS. 5 and 6 are a plan view and a side elevation respectively of a component shown sectioned in FIG. 4.
Figure 6:
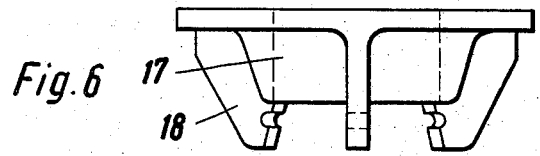

Three leaf springs as shown in FIG. 1 are incorporated in the friction clutch shown in FIGS. 2, 3 and 4 and described presently.

The illustrated clutch comprises a flywheel 8' which is coaxially connected with the drive shaft (not illustrated) and forms a housing for the active clutch components in conjunction with a cover 8 whose rim is fastened to the flywheel. Coaxially arranged in the housing is a pressure plate 11 and a friction disc 6'. The friction disc 6' is connected with the power take-off shaft 5' and located between the flywheel 8' and the pressure plate 11, respective friction linings of annular shape being interposed. Also mounted in the housing space of the clutch is a generally ring-shaped diaphragm spring 9. The pressure plate 11 is joined with the clutch cover 8 by the three leaf springs 4 in the manner more fully described below. Axial displacement is imparted to the pressure plate 11 by means of clutch release ring 17 which has three integral lugs 18 with respective catch recesses linked to the diaphragm spring 9. Shifting the ring 17 to the left (FIG. 4) causes the lugs 18 and the spring 9 to pull the pressure plate 11 away from the friction disc 6', thus opening the clutch and disconnecting the power transmission from the driving shaft to the driven shaft.

In FIG. 2 the cover 8 and the disc spring 9 are only partially shown. The disc spring 9 has its outer peripheral rim resting upon projections 10 of the pressure plate 11. At localities radially spaced from the outer periphery, the disc spring 9 is abutted on both sides by coaxial rings 12 held by pins 13 (FIG. 3) so that the disc spring can be turned or tilted.

As explained, the leaf springs 4 constitute the force transmitting members of the clutch and have a hole 5 located at the middle of their longitudinal extent. The middle opening 5 of each leaf spring is fastened by a rivet 15 to the pressure plate 11; and each two leaf springs 4 have respective ends jointly fastened by a rivet 14 to the outer rim of the cover 8. The fastening of the three leaf springs in the clutch is such that a pre-stress in the longitudinal direction of the leaf springs is superimposed upon the axially directed pre-stress so as to produce a resultant pre-stress. This manner of fastening the springs is in accordance with the explanation given above with reference to FIG. 1.

By virtue of this superposition of pre-stresses there is obtained a spring characteristic which secures a substantially constant spring pressure over the available or predetermined distance of spring deformation. This will be explained with reference to FIG. 7.

Figure 7:
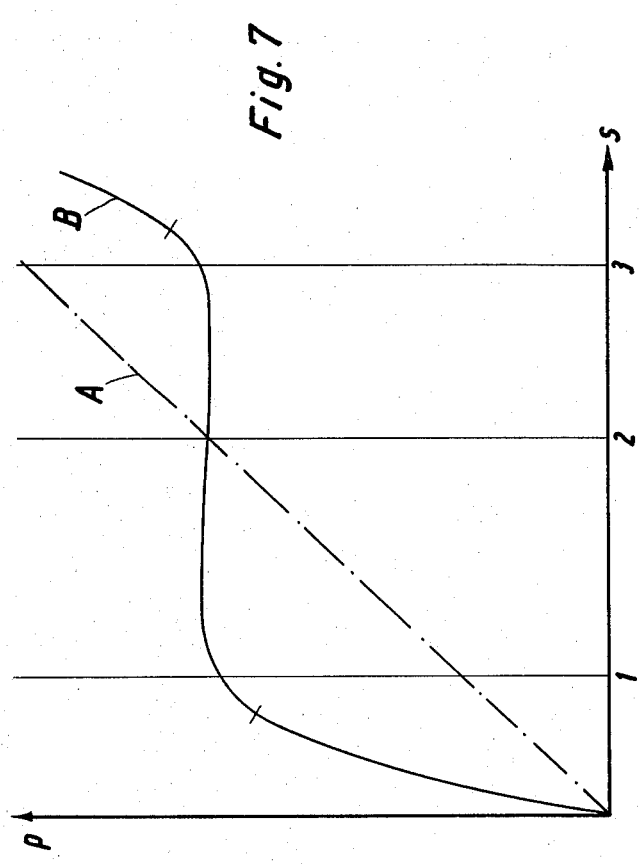
FIG. 7 is a explanatory graph relating to a spring characteristic of a clutch as shown in FIGS. 1 to 6, in comparison with a spring characteristic of a conventional clutch.

In the graph of FIG. 7, the abscissa denotes units of spring displacements, and the ordinate indicates the spring force p transmitted by the transmission members. The broken line A typifies the spring characteristic of a transmission member according to the conventional friction clutches in which the transmission members are pre-stressed in the axial direction of the clutch only. The spring characteristic of a transmission member according to the invention is represented by the curve B.

The spring force of the transmission members must possess a predetermined value at the operating point of the clutch, that is when the clutch is switched on. This value is indicated at 2 on the abscissa of the diagram. Depending upon the wear of the clutch linings, however, this operating point will shift toward the right and may reach a maximum in the region at 3. Point 1 on the abscissa designates the lifting point of the clutch and thus indicates the range down to which the transmission members are relieved when the clutch is opened.

It will be recognized that the spring displacement distance of the transmission members extends from the region of point 1 through the region 2 and, with increasing wear of the linings, up to the region of point 3. It will further be seen from FIG. 7 that, with a transmission member according to the invention, the spring force of the transmission members remains substantially the same over the entire possible spring displacement distance of the member. In contrast, the spring force of the transmission members in the conventional clutches varies considerably. Since the spring force of the transmission members is opposed to the force direction of the clutch pressure spring, the variation has the effect that in the known clutches the lifting of the clutch requires more force when the clutch is new than in an otherwise comparable new clutch according to the invention. With increasing wear of the clutch linings the pressure force of the clutch pressure spring decreases in a conventional clutch and thus poses the danger of slipping. With a transmission member according to the invention, however, the spring force remains approximately constant over the entire spring displacement path so that the influence upon the force required for closing or lifting the clutch also remains approximately constant over the entire working range and becomes to a great extent independent of the amount of wear.

It will be understood that force or torque transmitting members with corresponding fastening means that secure a combined pre-stressing in the axial as well as in the longitudinal direction as explained above are applicable to equal advantage with clutches other than the one particularly illustrated and described herein, and are also suitable as spring devices or regulating springs for a variety of other devices relative to which it is desirable to secure a substantially constant spring force along a given length of spring deformative travel with means of utmost simplicity.

We claim:

1. In a friction clutch assembly having two coaxially rotatable clutch structures, a radially fixed and axially displaceable frictional entrainer disc, one of said structures comprising an axially displaceable pressure plate disposed coaxially to said disc, plate spring means acting on said pressure plate for displacing the same into frictional engagement with said disc for closing the clutch, said pressure plate being displaceable against the action of said spring means for opening the clutch, individually elongated strap-like transmission members extending transversely to the clutch axial direction and connecting said pressure plate with the other of said clutch structures for torque transmission therebetween when the clutch is closed and for disengaging said pressure plate from said disc to open the clutch, said members having a wavy configuration along the length thereof and being elastically yieldable and prestressed in the clutch axial direction, said members also being prestressed in compression in the longitudinal direction thereof in superimposition to the prestress directed in the clutch axial direction, the resultant of said superimposed prestresses being effective over the entire working range of the clutch in the clutch axial direction wherein said pressure plate and said disc are disengageable so as to open the clutch.

2. Friction clutch according to claim 1, wherein the resultant of said superimposed prestresses is substantially constant over the entire working range of the clutch.

3. Friction clutch according to claim 1, wherein said elongated strap-like transmission members extend substantially in chord relation to said pressure plate.

4. Friction clutch according to claim 1, wherein said other of said clutch structures is a cover for the clutch.

5. Friction clutch according to claim 1, wherein said transmission members are fastened at the ends thereof to said one of said clutch structures and at a region intermediate said ends thereof to said pressure plate.

6. A friction clutch comprising two coaxially rotatable clutch structures, an entrainer disc, one of said structures comprising a pressure plate coaxially displaceable into and out of pressure engagement with said disc for closing and opening the clutch, individually elongated transmission members connecting said pressure plate with said other clutch structure for torque transmission, said members being elastically yieldable and prestressed in the clutch axial direction, and means for conjointly superimposing upon said transmission members a prestress in compression in the longitudinal direction of said members, said other clutch structure comprising a cover for the clutch, and including three of said elongated strap-like transmission members, said members consisting of leaf springs forming a triangular arrangement and fastened to the clutch cover and to said pressure plate, mutually adjacent ends of each two of said leaf springs having a fastening point in common.

7. In a clutch according to claim 6, said leaf springs having said mutually adjacent ends fastened to said clutch cover, and each of said leaf springs having its middle region fastened to said pressure plate.

8. A friction clutch comprising two coaxially rotatable clutch structures, an entrainer disc, one of said structures comprising a pressure plate coaxially displaceable into and out of pressure engagement with said disc for closing and opening the clutch, individually elongated transmission members connecting said pressure plate with said other clutch structure for torque transmission, said members being elastically yieldable and prestressed in the clutch axial direction, and means for conjointly superimposing upon said transmission members a prestress in compression in the longitudinal direction of said members, said elongated strap-like transmission members extending substantially in chord relation to said pressure plate and being each fastened in its middle to said plate, the ends of each of said members being fastened to said other clutch structure.

9. In a friction clutch assembly having two coaxially rotatable clutch structures, a radially fixed and axially displaceable frictional entrainer disc, one of said structures comprising an axially displaceable pressure plate disposed coaxially to said disc, spring means acting on said pressure plate for displacing the same into frictional engagement with said disc for closing the clutch, said pressure plate being displaceable against the action of said spring means for opening the clutch, three individually elongated strap-like transmission members extending transversely to the clutch axial direction and connecting said pressure plate with the other of said clutch structures for torque transmission therebetween when the clutch is closed and for disengaging said pressure plate from said disc to open the clutch, said members having a wavy configuration along the length thereof and being elastically yieldable and prestressed in the clutch axial direction, said members also being prestressed in the longitudinal direction thereof in superimposition to the prestress directed in the clutch axial direction, the resultant of said superimposed prestresses being effective over the entire working range of the clutch in the clutch axial direction wherein said pressure plate and said disc are disengageable so as to open the clutch, said transmission members consisting of leaf springs forming a triangular arrangement and fastened to said other clutch structure and to said pressure plate, mutually adjacent ends of each two of said leaf springs having a fastening point in common.

* * * * *